(12) United States Patent
Hendrick et al.

(10) Patent No.: US 10,700,865 B1
(45) Date of Patent: Jun. 30, 2020

(54) SYSTEM AND METHOD FOR GRANTING SECURE ACCESS TO COMPUTING SERVICES HIDDEN IN TRUSTED COMPUTING ENVIRONMENTS TO AN UNSECURE REQUESTOR

(71) Applicant: Sequitur Labs Inc., Issaquah, WA (US)

(72) Inventors: Michael Thomas Hendrick, Renton, WA (US); Philip Attfield, Fall City, WA (US)

(73) Assignee: Sequitur Labs Inc., Issaquah, WA (US)

( * ) Notice: Subject to any disclaimer, the term of this patent is extended or adjusted under 35 U.S.C. 154(b) by 86 days.

(21) Appl. No.: 15/787,550

(22) Filed: Oct. 18, 2017

Related U.S. Application Data

(60) Provisional application No. 62/411,436, filed on Oct. 21, 2016.

(51) Int. Cl.
*H04L 29/06* (2006.01)
*H04L 9/32* (2006.01)
*G06F 21/60* (2013.01)

(52) U.S. Cl.
CPC .............. *H04L 9/32* (2013.01); *G06F 21/602* (2013.01)

(58) Field of Classification Search
CPC ................................ H04L 9/32; G06F 21/602
See application file for complete search history.

(56) References Cited

U.S. PATENT DOCUMENTS

| 5,881,225 A | 3/1999 | Worth |
| 7,140,035 B1 | 11/2006 | Karch |

(Continued)

FOREIGN PATENT DOCUMENTS

| EP | 1339199 | 8/2003 |
| WO | PCT/US06/017123 | 1/2008 |

(Continued)

OTHER PUBLICATIONS

University of British Columbia, Department of Electrical and Computer Engineering, http://www.ece.ubc.ca//~edc/379,ian99/lecgureslec 13.pdf, accessed May 2014.

(Continued)

*Primary Examiner* — Chau Le
*Assistant Examiner* — Vance M Little
(74) *Attorney, Agent, or Firm* — JRG Attorneys at Law (57) ABSTRACT

A system and method for secure access to computing services in trusted computing environments. The present invention facilitates the execution of services in a secure environment by unsecure requestors where the requestor has no visibility into the secure environment. A remote service creates an encrypted data bundle (EDB) consisting of the request and associated data and transmits the EDB to the unsecure requestor. The EDB is then transmitted to the Trusted Service Receiver (TSR) in the secure environment that decrypts the EDB and determines if the request is valid and permissible. If valid and permissible, the TSR determines what secure service will be required and Trusted Services (TS) are invoked. TSR then collects results from each TS invoked and transmits the result according to the instructions in the request.

18 Claims, 6 Drawing Sheets

(56) References Cited

U.S. PATENT DOCUMENTS

| | | | |
|---|---|---|---|
| 7,240,015 B1 | 6/2007 | Karmouch | |
| 7,246,233 B2 | 7/2007 | Brabson et al. | |
| 7,400,891 B2 | 7/2008 | Aaron | |
| 7,640,429 B2 | 12/2009 | Huang et al. | |
| 7,797,544 B2 | 9/2010 | Dillaway | |
| 7,941,647 B2 | 5/2011 | Yates | |
| 8,014,721 B2 | 9/2011 | Johnson | |
| 8,037,318 B2 | 10/2011 | Tahan | |
| 8,127,982 B1 | 3/2012 | Casey et al. | |
| 8,135,385 B2 | 3/2012 | Ohta | |
| 8,176,336 B1 | 5/2012 | Mao | |
| 8,185,959 B2 | 5/2012 | Bellwood | |
| 8,230,399 B2 | 7/2012 | Vertes | |
| 8,285,249 B2 | 10/2012 | Baker et al. | |
| 8,321,498 B2 | 11/2012 | Maes | |
| 8,463,819 B2 | 6/2013 | Shashikumar et al. | |
| 8,468,586 B2 | 6/2013 | Kootayi et al. | |
| 8,468,608 B1 | 6/2013 | Hernacki | |
| 8,538,843 B2 | 9/2013 | Smith | |
| 8,922,372 B2 | 1/2014 | Soffer | |
| 8,688,592 B1 | 4/2014 | Abramson | |
| 8,880,047 B2 | 11/2014 | Konicek | |
| 8,904,483 B1 | 12/2014 | Martini | |
| 9,053,456 B2 | 6/2015 | Verthein | |
| 9,264,384 B1* | 2/2016 | Sundaresan | H04L 67/1097 |
| 9,391,782 B1 | 7/2016 | Mironenko | |
| 9,411,962 B2 | 8/2016 | Attfield | |
| 2001/0032320 A1* | 10/2001 | Abdelnur | H04L 29/06 726/7 |
| 2002/0101826 A1 | 8/2002 | Giacopelli | |
| 2002/0138814 A1 | 9/2002 | Katayama | |
| 2003/0033541 A1* | 2/2003 | Edmark | H04L 63/1408 726/4 |
| 2003/0105951 A1* | 6/2003 | Brabson | H04L 63/04 713/151 |
| 2003/0125925 A1 | 7/2003 | Walther | |
| 2004/0123139 A1 | 6/2004 | Aiello | |
| 2004/0123153 A1 | 6/2004 | Wright | |
| 2004/0204949 A1 | 10/2004 | Shaji | |
| 2005/0132202 A1 | 6/2005 | Billaway | |
| 2005/0193196 A1 | 9/2005 | Huang | |
| 2006/0005239 A1 | 1/2006 | Mondri | |
| 2006/0026548 A1 | 2/2006 | Rosener | |
| 2006/0059565 A1 | 3/2006 | Green | |
| 2006/0150256 A1 | 7/2006 | Fanton | |
| 2006/0236369 A1 | 10/2006 | Covington | |
| 2006/0236385 A1 | 10/2006 | Innes | |
| 2007/0150559 A1 | 6/2007 | Smith | |
| 2008/0049937 A1* | 2/2008 | Pauker | H04L 63/0442 380/270 |
| 2008/0085698 A1 | 4/2008 | Gamm | |
| 2008/0133914 A1 | 6/2008 | Isaacson | |
| 2008/0184336 A1 | 7/2008 | Sarukkai | |
| 2008/0194233 A1 | 8/2008 | Henry | |
| 2008/0235508 A1* | 9/2008 | Ran | H04L 63/0428 713/151 |
| 2009/0031141 A1 | 1/2009 | Pearson | |
| 2009/0089125 A1 | 4/2009 | Sultan | |
| 2009/0100269 A1 | 4/2009 | Naccache | |
| 2009/0193503 A1 | 7/2009 | Shevchenko | |
| 2009/0198617 A1 | 8/2009 | Soghoian | |
| 2009/0204785 A1 | 8/2009 | Yates, Jr. et al. | |
| 2009/0205016 A1 | 8/2009 | Milas | |
| 2009/0210707 A1* | 8/2009 | De Lutiis | H04L 63/123 713/170 |
| 2009/0300174 A1 | 12/2009 | Floris | |
| 2010/0011207 A1* | 1/2010 | Fox | H04L 63/0209 713/155 |
| 2010/0023454 A1 | 1/2010 | Exton | |
| 2010/0023703 A1 | 1/2010 | Christie | |
| 2010/0037058 A1* | 2/2010 | Zhuk | G06F 21/335 713/176 |
| 2010/0037311 A1 | 2/2010 | He | |
| 2010/0199325 A1 | 8/2010 | Raleigh | |
| 2010/0216429 A1 | 8/2010 | Mahajan | |
| 2010/0250370 A1 | 9/2010 | Jones et al. | |
| 2011/0055890 A1 | 3/2011 | Gaulin | |
| 2011/0063098 A1 | 3/2011 | Fischer | |
| 2011/0077758 A1 | 3/2011 | Tran | |
| 2011/0154034 A1 | 6/2011 | Bailey, Jr. | |
| 2011/0173108 A1 | 7/2011 | Rjasekar | |
| 2011/0173122 A1 | 7/2011 | Singhal | |
| 2011/0251958 A1 | 10/2011 | Aubin | |
| 2011/0258692 A1 | 10/2011 | Morrison | |
| 2011/0270751 A1 | 11/2011 | Csinger | |
| 2012/0030731 A1 | 2/2012 | Bhargava | |
| 2012/0129450 A1 | 5/2012 | Lee | |
| 2012/0197743 A1 | 8/2012 | Grigg | |
| 2012/0197898 A1* | 8/2012 | Pandey | G06F 16/2264 707/741 |
| 2012/0214516 A1 | 8/2012 | Rosenberg | |
| 2012/0216012 A1 | 8/2012 | Vorbach et al. | |
| 2012/0270523 A1 | 10/2012 | Laudermilch | |
| 2012/0317396 A1* | 12/2012 | Ellis, III | H04L 67/10 712/29 |
| 2012/0323596 A1 | 12/2012 | Verhulst | |
| 2012/0323717 A1 | 12/2012 | Kirsch | |
| 2013/0029653 A1 | 1/2013 | Baker et al. | |
| 2013/0080411 A1 | 3/2013 | Rolia | |
| 2013/0086652 A1* | 4/2013 | Kavantzas | G06F 21/335 726/5 |
| 2013/0125099 A1 | 5/2013 | Budiu | |
| 2013/0130650 A1 | 5/2013 | Cheung | |
| 2013/0144935 A1* | 6/2013 | Valdetaro | H04L 63/0281 709/203 |
| 2013/0145429 A1 | 6/2013 | Mendel | |
| 2013/0212022 A1 | 8/2013 | Lanc | |
| 2013/0253942 A1 | 9/2013 | Liu et al. | |
| 2013/0275746 A1 | 10/2013 | Galdwin | |
| 2013/0298664 A1 | 11/2013 | Gillette, II | |
| 2014/0007193 A1 | 1/2014 | Qureshi | |
| 2014/0013112 A1 | 1/2014 | Cidon | |
| 2014/0096186 A1 | 4/2014 | Barton | |
| 2014/0108695 A1* | 4/2014 | Rachakonda | G06F 15/7842 710/305 |
| 2014/0115659 A1 | 4/2014 | Attfield et al. | |
| 2014/0143089 A1 | 5/2014 | Campos | |
| 2014/0173700 A1 | 6/2014 | Awan | |
| 2014/0195425 A1 | 7/2014 | Campos | |
| 2014/0279474 A1 | 9/2014 | Evan | |
| 2014/0359035 A1* | 12/2014 | Wang | H04L 51/06 709/206 |
| 2014/0379361 A1 | 12/2014 | Mahakar | |
| 2015/0113264 A1* | 4/2015 | Wang | H04L 63/0823 713/151 |
| 2015/0227925 A1 | 8/2015 | Filler | |
| 2015/0271270 A1* | 9/2015 | Edlund | G06F 16/00 709/227 |
| 2015/0278810 A1 | 10/2015 | Ramatchandirane | |
| 2015/0302409 A1 | 10/2015 | Malek | |
| 2015/0312277 A1 | 10/2015 | Rane et al. | |
| 2015/0334133 A1 | 11/2015 | Schaffner et al. | |
| 2015/0350254 A1 | 12/2015 | Hendrick et al. | |
| 2015/0358822 A1 | 12/2015 | Hendrick et al. | |
| 2016/0012216 A1 | 1/2016 | Attfield et al. | |
| 2016/0314296 A1 | 10/2016 | Attfield et al. | |
| 2017/0048714 A1 | 2/2017 | Attfield et al. | |
| 2017/0244759 A1 | 8/2017 | Attfield et al. | |

FOREIGN PATENT DOCUMENTS

| | | |
|---|---|---|
| WO | PCT/US08/009313 | 2/2009 |
| WO | WO2015/026389 | 2/2015 |
| WO | PCT/US15/24932 | 4/2015 |
| WO | PCT/US15/27561 | 4/2015 |
| WO | PCT/US14/70897 | 12/2015 |
| WO | PCT/US15/048526 | 3/2016 |
| WO | PCT/US16/28481 | 10/2016 |

(56) References Cited

FOREIGN PATENT DOCUMENTS

| WO | PCT/US16/032502 | 11/2016 |
|----|-----------------|---------|
| WO | PCT/US16/029144 | 2/2017  |

OTHER PUBLICATIONS

"Computer Architecture: A Quantitative Approach", Hennessy J. and Patterson, D., 5th Ed. Morgan Kaufman (2011).

"Computer Networks", Tanenbaum, A. Andrew and Wetherall, D., 5th Ed. Prentice Hall (2010).

"Prolog Programming: A First Course", Brna, P. (Mar. 5, 2001). Retrieved from <http://homepages.inf.ed.ac.ud/pbrna/prolog.book/> on Mar. 16, 2013.

NFC Forum (2007), "Near Field Communication and the NFC Forum: The Keys to Truly Interoperable Communications" (PDF), http://www.nfc-forum.org, retrieved Oct. 30, 2012.

Landt, Jeremy (2001), "Shrouds of Time: The history of RFID", AIM, Inc. pp. 5-7.

Bluetooth Special Interest Group website, "A Look at the Basics of Bluetooth Wireless Technology", http:www.bluetooth.com/Pages/Basics.aspx, retrieved Oct. 29, 2012.

See e.g. H. Schildt, C ++—The Complete Reference, 2nd edition, pp. 67-70 McGraw Hill, 1995, ISBN 0-07-882123-1.

K. Ashton, "That 'Internet of Things' Thing", RFID Journal Jun. 22, 2009 (available online as of Oct. 20, 2013 at http://www.rfidjournal.com/articles/view?4986).

T. White, Hadoop—The Definitive Guide, O'Reilly, 2009 978-0-596-52197-4.

Nakamoto, Satoshi. "Bitcoin: A peer-to-peer electronic cash system." Consulted Jan. 2012 (2008): 28. Obtained from http://www.cryptovest.co.ok/resources/Bitcoin%20paper%20 Original.pdf on Apr. 6, 2015.

Bitcoin, Inc. "What are multi-signature transactions?", Obtained from http://bitcoin.stackexchange.com/questions 3718/what-are-multi-signature-transactions on Apr. 6, 2015.

Verilog, http://www.verilog.comm/, accessed May 12, 2014.

L. Woods, ZS. Istvan, G. Alonzo Ibex(2014) An Intelligent Storage Engine with Support for Advanced SQL Off-loading. VLDB 2014k, Hangzhou, China, Sep. 2014.

University of British Columbia, Department of Electrical and Computer Engineering, http://www.ece.ubc.ca//~edc/379,jan99/lecgureslec 13.pdf, accessed May 2014.

IEEE P 1076 Working Group. http://www.eda.org/twiki/bin/view.cgi/P1076, accessed May 12, 2014.

Global Platform 2015—The Trusted Execution Environment: Delivering Enhanced Security at a Lower Cost to the Mobile Market—White Paper Jun. 2015, revised from Feb. 2011.

\* cited by examiner

SYSTEM AND METHOD FOR GRANTING SECURE ACCESS TO COMPUTING SERVICES HIDDEN IN TRUSTED COMPUTING ENVIRONMENTS TO AN UNSECURE REQUESTOR

TECHNICAL FIELD

The present invention relates generally to the technical fields of Computer Security, Mobile Computing, Telecommunications, Digital Communications, and Computer Technology.

BACKGROUND OF THE INVENTION

With the rapid proliferation of network enabled computing devices (the so-called Internet of Things, also referred to as IoT) along with ubiquitous mobile personal devices and conventional computing platforms, the importance of secure, reliable computing environments is paramount. Failure to properly implement security on these new network-enabled devices not only threatens the devices themselves but could be a vulnerability for entire networks and all associated users. This is a critical problem.

Secure access, management, and control of computing devices with compact or otherwise constrained processing hardware and networking hardware such as those found in the Internet of Things presents a number of challenges. Such devices may be constantly exposed to malicious attacks via the internet. These devices are usually remote and physically difficult or time-consuming to access directly by the permitted device users and administrators.

Many developers of IoT products and services do not focus on security as a priority—they understandably focus on their device or service features and capabilities. They typically acquire core computational components and component designs from a small set of candidate suppliers having the resources to produce such complex items in large numbers. Also, these devices tend to be computationally lightweight and therefore have limited resources with which to implement reliable security. Therefore, a successful solution must be compatible with any set of components for any purpose, shifting the burden of security to the present solution thus freeing product developers to focus on features and capabilities. Developers of computer code for such devices benefit from having secure computing tools and secure services present, available, and compatible so as to assist them in the development of secure computing code for the operation and control of these devices.

One key approach to defending these security-related systems and components from malicious attack is to have all or part of them reside in specially configured secure areas, partitions, or environments on the device hardware that are inaccessible to unauthorized parties, and which cannot be accessed for unauthorized purposes. The secure areas can be configured separate from the main device operating system, and represent "trusted worlds" or "secure worlds". In some instances, the secure areas can be configured to prevent access to certain resources.

A further level of security can be provided if such secure areas or partitions are configured to be invisible and/or undetectable, to the greatest degree possible, to unauthorized parties, or under unauthorized circumstances. In such cases, the secure areas can be considered "secure worlds", or "trusted worlds", functionally and otherwise separate from non-trusted operations in the untrusted or "real" world. By analogy, one level of security is to lock the door, and a second level of security is to lock the door and hide it from view. The present invention is such a solution to the security problem for IoT (and IoT-like) devices.

One specification for the operation of such secure areas is provided by GlobalPlatform (2016). Furthermore, Steeves, 2015, (U.S. patent application Ser. No. 14/610,869) describes a dedicated data security service with extensive decryption capability associated with a computing cluster.

This invention discloses a system and method for securely accessing services held within such secure environments for permitted uses that are driven by requests for those services originating from outside the containing secure environments themselves.

BRIEF SUMMARY OF THE INVENTION

The problem solved by the present invention is that of secure accessibility of services residing within a secure (trusted) computing environment from requests originating from outside of the secure (untrusted) environment. An important feature of the present invention concerns the inability of the unsecure requestor to know about trusted services or how to access them. The requestor need only know what it wants to do. That request is sent to a "clearing house" or "gateway" in the secure environment that does know what services are available and how to access them.

The present invention incorporates a Trusted Service Receiver (TSR) that resides within the secure environment. This is the gate keeper of the secure environment and all of its resources. The method begins with a requestor in the unsecure environment that needs something done in the secure environment. The requestor knows neither what services are needed (e.g. what they are called, what parameters they require) nor how to access them. The requestor only knows that services are needed in the secure environment. The request is coupled to any pertinent data, instructions, conditions, or anything else that may be needed. The request and associated data are encrypted into an encrypted data bundle (EDB) and the EDB is transmitted to the TSR in the secure environment. The TSR accepts and decrypts the EDB. Security policies are applied by the TSR to determine what services will be required and what parameters are associated with those service requests.

If the TSR determines that the request is allowed (permissible) but incomplete (e.g. missing parameter or other resource), the TSR may communicate with the requestor to complete the request depending on the stringency of the communication policy.

Each trusted service (TS) is now invoked by the TSR within the secure environment. The results of each TS are gathered by the TSR which, when complete, encrypts all results into an EDB which is transmitted back to the requestor in the unsecure environment.

The primary advantage of this solution is that it clearly separates the secure from the unsecure environments but the added benefit over previous solutions is that it also obscures any interface to protected services through the abstraction of the TSR, which results in superior overall security of the secure environment.

DETAILED DESCRIPTION OF THE INVENTION

Figure 1:
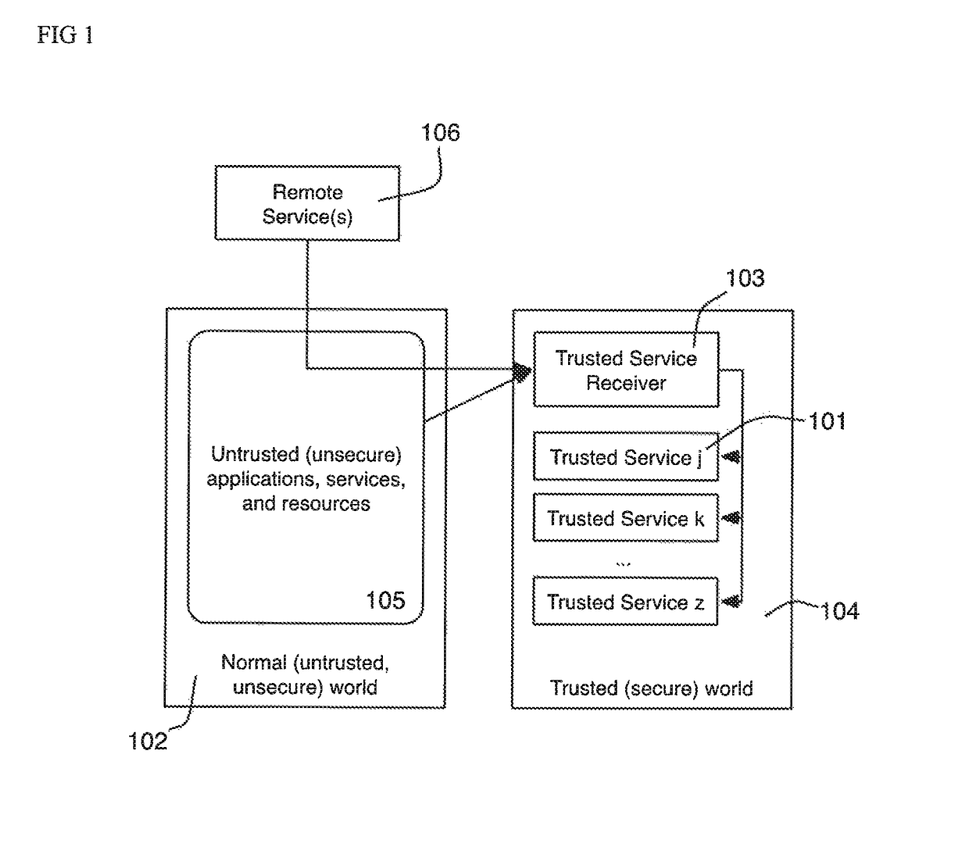
FIG. 1. Architecture for secure receiving service and secure service communication FIG. 2. Detailed components of the basic Trusted Service Receiver FIG. 3. Detailed components of the Trusted Service Receiver that includes a policy engine FIG. 4. Basic flow diagram of the invention FIG. 5. Flow diagram including a policy engine FIG. 6. Architecture for secure receiving service with separate cryptographic service

In the present invention, a set of computational services individually denoted $TS_j$ (101), is operating, or new operating instances of such services can be instantiated to operate, within the secure world denoted TW (104). These services are not visible from the non-trusted world RW (102), or from applications, services, resources, or operating systems in the RW (105). Separate from the $TS_j$, a second service type known as a receiving service and hereinafter service TSR (103), is operated in the secure world. FIG. 1 is representative of these services and the communication between them. There is no application program interface (API) nor any other way for an external source to know of the existence of anything within TW other than the TSR. The TSR does not provide any form of discovery service.

Figure 2:
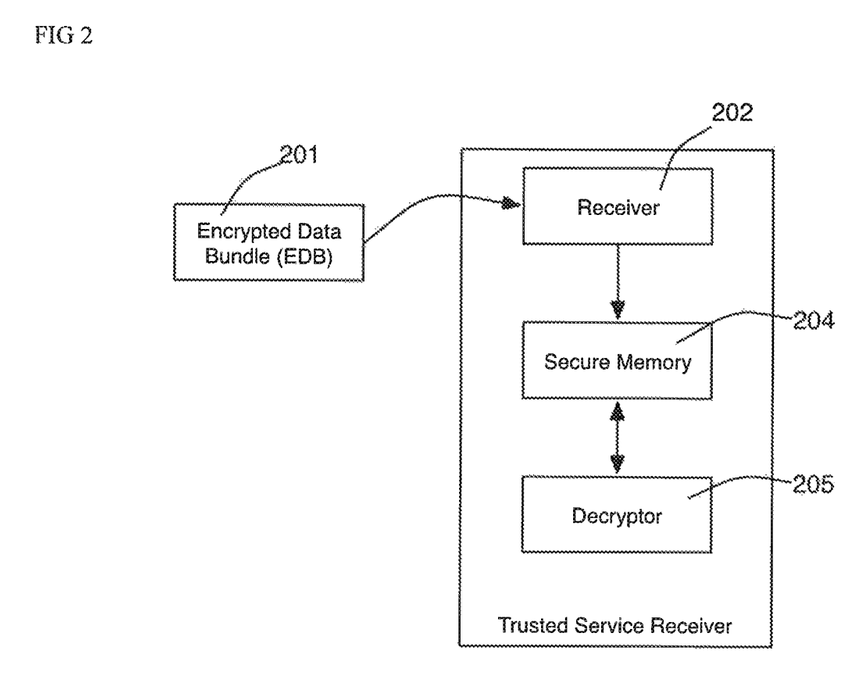
Figure 3:
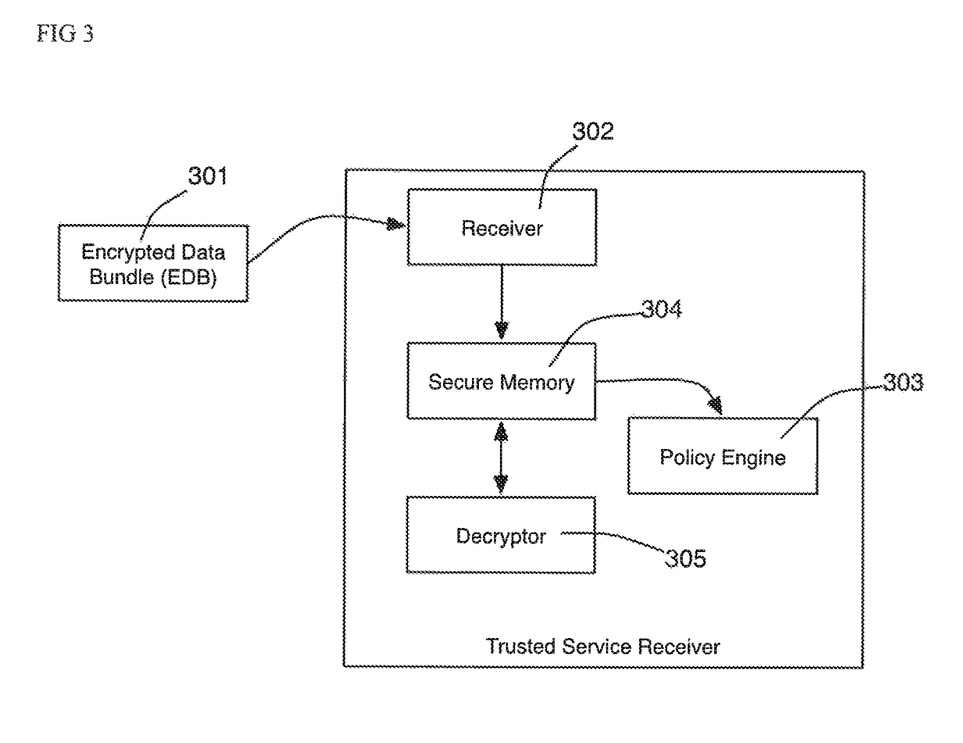
Figure 4:
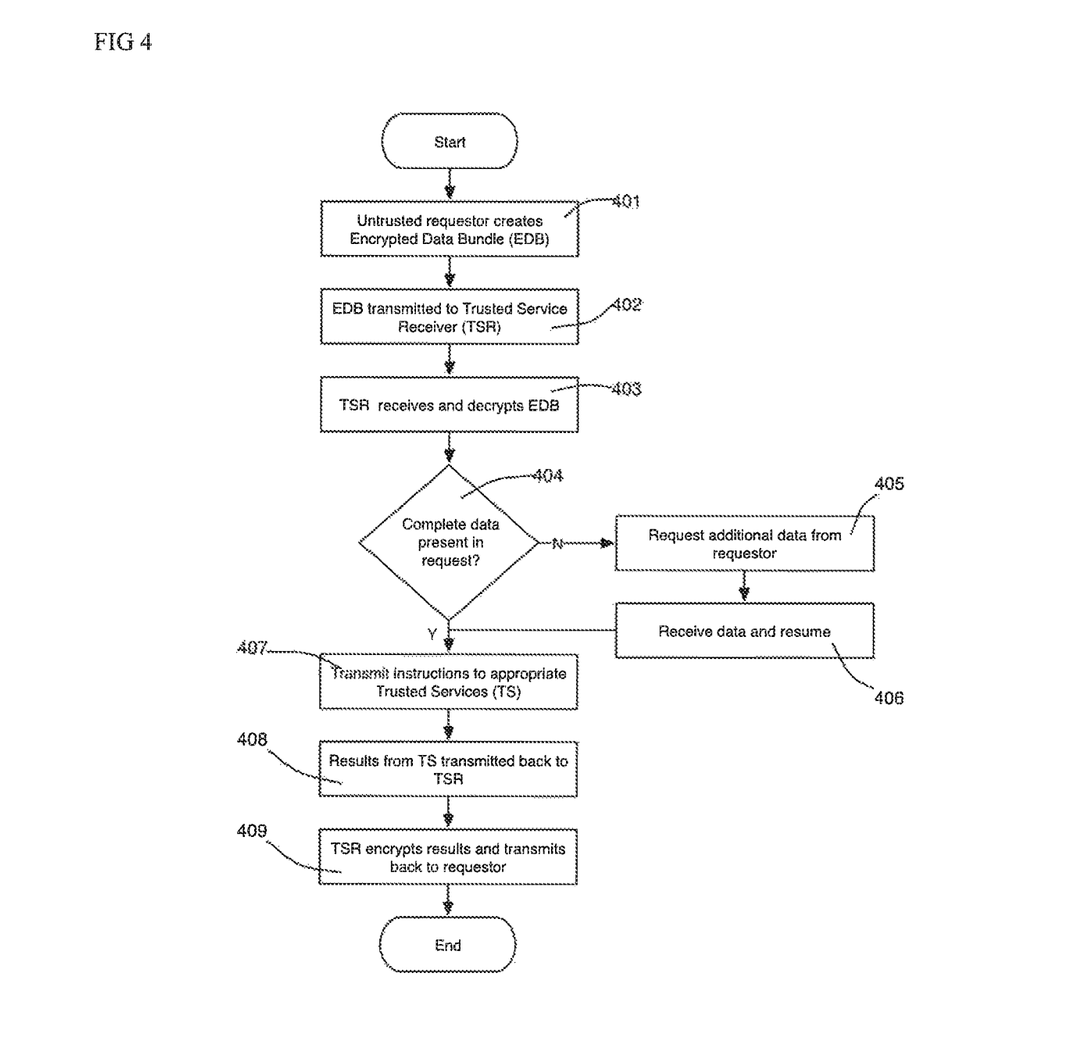
Figure 5:
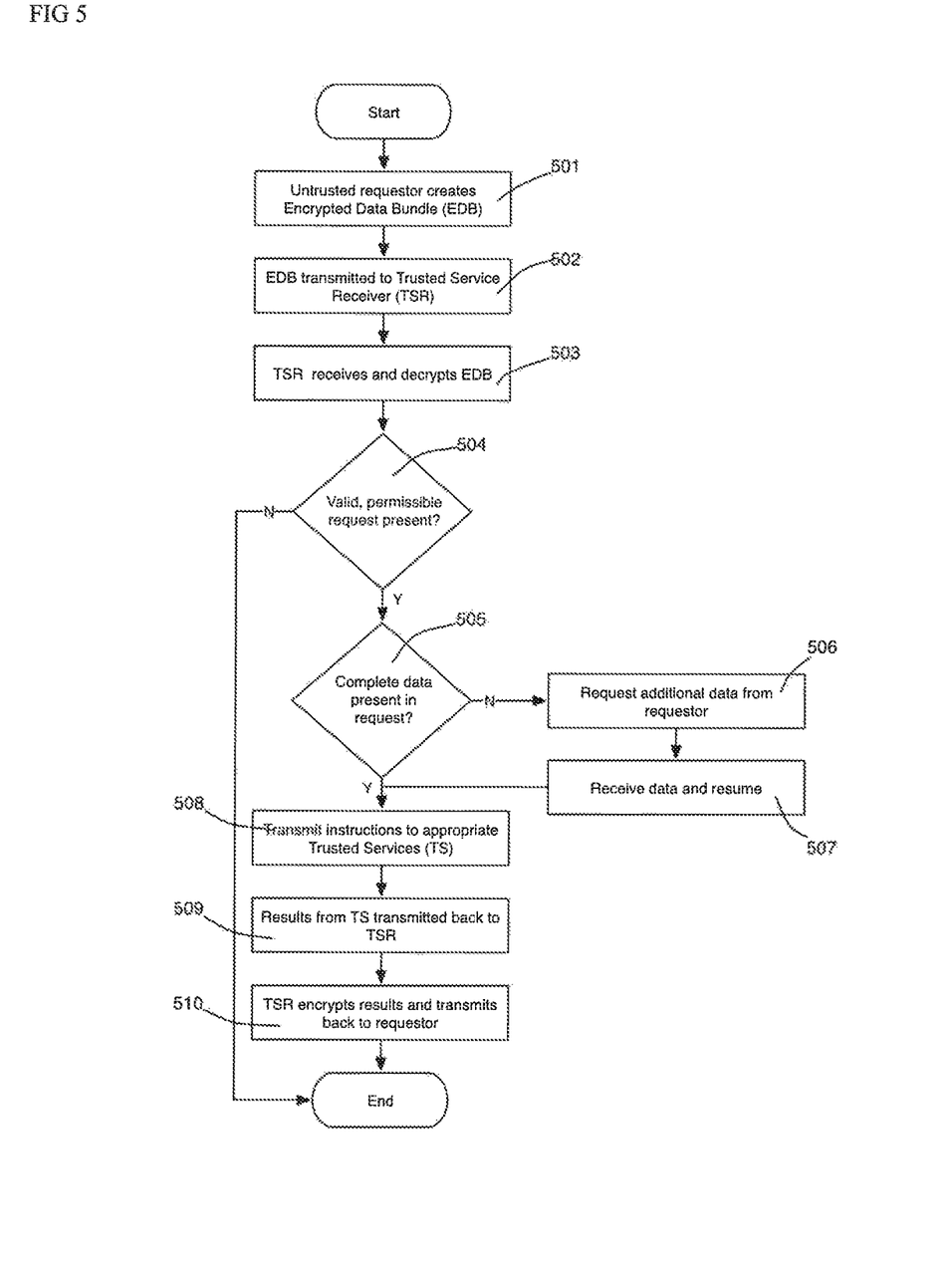

Service TSR (FIG. 2 shows the basic TSR; FIG. 3 shows the TSR that includes a policy engine; FIG. 4 shows a basic flow diagram; and FIG. 5 shows a flow diagram including a policy engine) has the function of receiving messages (202, 302, 402, 502) containing encrypted data bundles (EDB) (201, 301, 401, 501), from other sources, said sources being either within or external to the TW, processing said EDBs to include writing the EDB to a secure memory (204, 304) and decrypting it (205, 305, 403, 503), (optionally) applying policy rules to determine the permissibility of the requested actions (303, 504), and communicating their content to services in the TW such as $TS_j$ (101). EDBs may be received from either local or remote (106) devices, processes, or servers. Said EDBs contain, in encrypted form, sets of instructions and supporting information to be used in operating service TS. TSR decrypts these EDBs (403, 503) and then communicates the instructions to a TS (407, 508). The receiving TS then processes the instructions and supporting information, to perform the requested service functions. The results of the TS processing are transmitted back to the TSR (408, 509), they are finally encrypted and transmitted back to the requestor (409, 510).

Service TSR thereby operates as a request-receiving service, decryption service, clearing house and gateway for received service calls. Additional security policies may be enforced at TSR to prevent unauthorized service usage (504). The EDB can also contain additional content such as attestation as to the trustworthiness of its instruction contents, that would be examinable once the EDB is decrypted to determine whether or not the accompanying instructions should be sent on to a TS for processing. Attestation information concerning the EDB may also be received separately from the EDB itself.

If any parameter is missing (505) the receiving service may respond in one of several ways, depending on security "stringency", that is, how much information is allowed to be provided back to the requester, so as to minimize opportunities for malicious attack. At the highest level of stringency, no response is given when the TSR receives an incomplete or otherwise invalid request. It simply does not execute and the TSR moves on to the next request. At a lower level of stringency, a brief error message may be provided by the TSR in response to such a request. That alert may be nothing more than a warning that execution did not successfully complete. At the lowest level of stringency, the TSR may respond with an error message and some stipulation as to why the inbound request was incomplete or invalid, such as a list of missing parameters, such that the requester has the opportunity to try another request with a corrected parameter set (506). An instance of the invention may implement one or more of these stringency levels and may be configured such that a specific level is in effect if more than one level is available.

As a non-limiting example of the operation of the present invention (see FIGS. 4 and 5), a requestor wishes to access an external resource. The requestor does not know that the resource is protected, that it operates within a secure environment, or that there is a gatekeeper protecting access to the resource. The requestor only knows that it wishes access to access the remote resource and that the Trusted Service Receiver (TSR) is the access point to that resource.

The requestor then creates an Encrypted Data Bundle (EDB) that includes a request for the protected resource and any associated data that the requestor wishes to include. (401, 501) Here, for example, if the requestor wishes to make an SQL query into a database (not knowing that it is protected), it would bundle and encrypt the access request to the database along with the necessary elements of a well-formed SQL query. The resulting EDB is then transmitted to the TSR. (402, 502) The TSR receives and decrypts the EDB. (403, 503) At this point in this example, the TSR may need to know the identity of the requestor in order to determine if access can be allowed. The requestor's identity was not included in the initial EDB. Therefore, depending on the level of stringency, the TSR will take one of three possible actions. (404, 505)

1. (Highest level) The TSR does nothing. The query is not executed and nothing is returned to the requestor.

2. (Mid-level) The TSR transmits a failure message to the requestor with no further information. The requestor now knows that the request to query the database was unsuccessful but does not know why.

2. (Lowest level) The TSR transmits a failure message to the requestor along with information as to why the request failed. (405, 506) Here, it may inform the requestor that the requestor's identity is required. In this way, the requestor can try again including the missing information. (406, 507)

At this point, either the request initiated by the requestor has failed and the process has ended, or the TSR has a valid request that it can act upon. The request is sent to the appropriate trusted service (TS). (407, 508) In this example, the database executes the SQL query which returns a result. (408, 509) That result is then bundled together with any other results associated with this requestor. The results are encrypted and transmitted back to the requestor. (409, 510)

As an alternate embodiment to the invention, individual receiving services $TSR_i$ can be set up to receive, decrypt, and communicate EDBs specifically for specific services $TS_j$.

Figure 6:
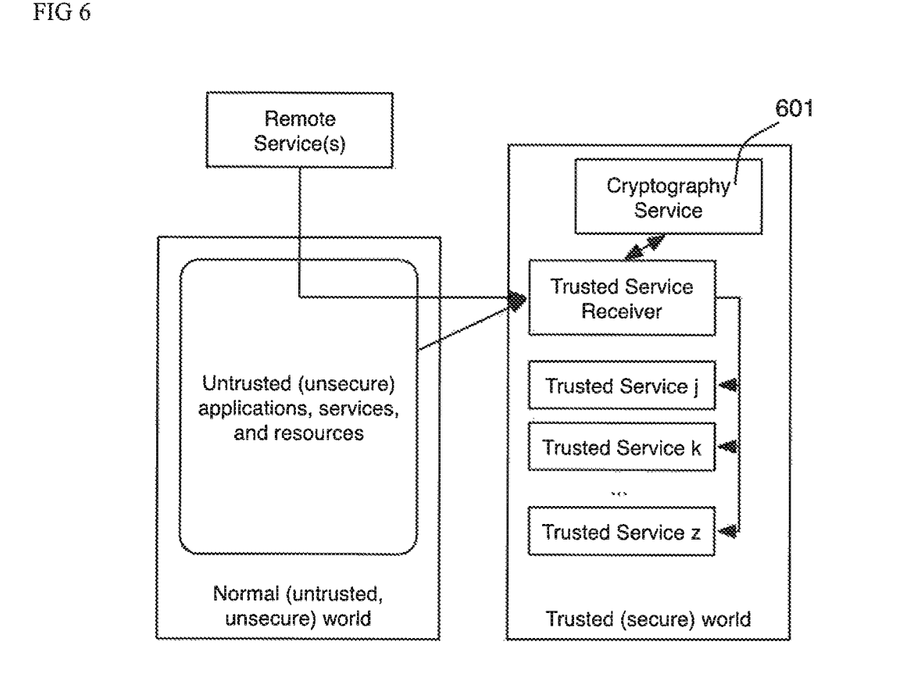

In another embodiment, as shown in FIG. 6, decryption operations on the received EDB can be handled by specialized cryptography services (601) provided in the Trusted World, separate from the receiving service. In this way, complex and processing-intensive decryption operations can be performed quickly by specialized hardware (hardware acceleration) or by other means.

By the means described above, a service in the secure world can be exposed only through the described receiving service (TSR); a receiving service in the secure world is set up that will receive an encrypted EDB, decrypt it then process the contents as a sequence of service calls. Essentially this gives a remote code delivery and service management mechanism. The underlying communication channel has no visibility to the contents. The normal world NW also has no visibility. One use case for example is that a remote server can send different authentication sequences depending on the given situation.

INDUSTRIAL APPLICATION

The present invention is useful for any computing domain where trusted services must be maintained separately from untrusted services. Any industry that deal with sensitive data or processes that must be securely maintained will benefit from this invention because the complete abstraction of the services from the requestor yields superior security from probing or other unwanted attempts to access.

CITATION LIST

Steeves, D. (Filed Jan. 30, 2015). "Systems and Methods for Providing Data Security Services," U.S. patent application Ser. No. 14/610,869.
GlobalPlatform (Accessed, Oct. 4, 2016), "The Trusted Execution Environment: Delivering Enhanced Security at a Lower Cost to the Mobile Market," Accessed at http:// www.globalplatform.org/documents/whitepapers/ GlobalPlatform_TEE_Whitepaper_2015.pdf

What is claimed is:

1. A system for secure execution of instructions by trusted services in a secure computing environment hidden from a requestor residing in an unsecure computing environment, the system comprising:
a remote service for initiating a request by the unsecure environment, including a specified sequence of trusted services and associated data that are required to execute the request, and including a first processor for bundling and encrypting said specified sequence of trusted services and associated data into encrypted data bundles;
the unsecure environment communicatively coupled to the remote service having an unsecure memory containing unsecure applications, services, and resources, whereby the unsecure environment receives the encrypted data bundles from the remote service;
the secure environment communicatively coupled to the unsecure environment, said secure environment having a secure memory for storing encrypted data bundles within the secure environment, whereby the secure environment receives the encrypted data bundles from the unsecure environment;
a decryptor coupled to the secure memory whereby a second processor decrypts the encrypted data bundles and for storing the decrypted data in the secure memory;
a trusted service receiver coupled to the secure memory and the decryptor, for processing encrypted and decrypted data bundles;
at least one trusted service coupled to the trusted service receiver for executing instructions as directed by the trusted service receiver within the secure environment to produce a result; and
a transmitter coupled to the trusted service receiver transmitting the result to the requestor in the unsecure environment.

2. The system of claim 1, wherein the trusted service receiver further includes a policy engine for determining if the request in the decrypted data bundle is permissible.

3. The system of claim 1, further including
a service allocator for invoking trusted services to complete the decrypted request; and
a result aggregator for collecting thy: results from each trusted service.

4. The system of claim 1, further including an error checker that, depending on level of stringency indicated, provides a response to the requestor when a request cannot be executed, the feedback including one of:
no feedback,
limited feedback indicating the occurrence of an error with no detail about the error, and
detailed feedback indicating the occurrence of an error with description of the error and possible remedies.

5. The system of claim 1, wherein the encrypted data bundles further include attestation information in regard to the trustworthiness of the received encrypted data bundles, said attestation being used for approval to process the encrypted data bundles and subsequent instruction communication to the at least one trusted service.

6. The system of claim 5, wherein the attestation is received separately from the encrypted data bundles.

7. The system of claim 1, wherein the secure computing environment is contained within a single computing device.

8. The system of claim 1, wherein the operation of the trusted service receiver and the at least one trusted service in the secure environment is performed on a single, dedicated processor.

9. The system of claim 1, wherein specific trusted services are managed exclusively by an associated dedicated trusted service receiver that is configured to receive, decrypt, and communicate encrypted data bundles for the associated specific trusted services.

10. The system of claim 1, wherein the decryptor resides in a separate cryptography service.

11. The system of claim 10, wherein the cryptography service is hardware-accelerated.

12. The system of claim 1 wherein the unsecure environment and the secure environment reside on the same computing device.

13. The system of claim 1 further including:
an encryptor coupled to the trusted service receiver in the secure environment for encrypting the result from the at least one trusted service; and
wherein the transmitter transmits the encrypted result to the remote service.

14. The system of claim 1 wherein the transmitter transmits the encrypted result to the remote service via the unsecure environment.

15. A method for secure execution of instructions by trusted services in a secure computing environment hidden from a requestor residing in an unsecure computing environment, the steps comprising:
specifying a sequence of trusted services and associated data at a remote service that are required to initiate a request by the unsecure environment;
bundling and encrypting said sequence of trusted services and associated data into encrypted data bundles;
transmitting the encrypted data bundles through the unsecure environment to a trusted service receiver in the secure environment, whereby the unsecure environment includes unsecure applications, services, and resources;
decrypting and storing the encrypted data bundle in a secure memory within the secure environment;
invoking at least one trusted service computation within the secure environment as directed by the trusted service receiver to compute instructions pertaining to the request in the decrypted data bundles to produce a result; and transmitting the result to the requestor in the unsecure environment.

16. The method of claim 15, further including the step:

applying policy rules to the request within the decrypted data bundle to determine the permissibility of the request before invocation of trusted services.

17. The method of claim 15, further including the step:

aggregating the results of multiple trusted service computations before transmission when the request calls for more than one trusted service with more than one result.

18. The method of claim 15, further including the steps encrypting the result of the trusted service computation; and transmitting the encrypted result to the remote service.

\* \* \* \* \*

UNITED STATES PATENT AND TRADEMARK OFFICE
CERTIFICATE OF CORRECTION

PATENT NO. : 10,700,865 B1
APPLICATION NO. : 15/787550
DATED : June 30, 2020
INVENTOR(S) : Hendrick et al.

Page 1 of 1

It is certified that error appears in the above-identified patent and that said Letters Patent is hereby corrected as shown below:

In the Claims

Column 6, Line 4 (Claim 3), delete "thy:" and replace with "the".

Signed and Sealed this
Third Day of November, 2020

Andrei Iancu
*Director of the United States Patent and Trademark Office*